(12) United States Patent
Leijon et al.

(10) Patent No.: US 6,873,080 B1
(45) Date of Patent: Mar. 29, 2005

(54) SYNCHRONOUS COMPENSATOR PLANT

(75) Inventors: Mats Leijon, Västerås (SE); Bertil Berggren, Västerås (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/509,438

(22) PCT Filed: Sep. 29, 1998

(86) PCT No.: PCT/SE98/01736
§ 371 (c)(1),
(2), (4) Date: Jun. 13, 2000

(87) PCT Pub. No.: WO99/17427
PCT Pub. Date: Apr. 8, 1999

(30) Foreign Application Priority Data

Sep. 30, 1997 (SE) .............................................. 9703550

(51) Int. Cl.[7] ................................................ H02K 3/40
(52) U.S. Cl. ............... 310/196; 310/184; 174/DIG. 19; 174/DIG. 22; 174/DIG. 28; 322/1; 322/33
(58) Field of Search ............... 322/1, 33; 310/179–180, 310/184, 195–196, 208, 213; 290/1 R; 174/DIG. 13–33

(56) References Cited

U.S. PATENT DOCUMENTS

| | | |
|---|---|---|
| 681,800 A | 9/1901 | Lasche |
| 847,008 A | 3/1907 | Kitsee |
| 1,304,451 A | 5/1919 | Burnham |
| 1,418,856 A | 6/1922 | Williamson |
| 1,481,585 A | 1/1924 | Beard |
| 1,508,456 A | 9/1924 | Lenz |
| 1,728,915 A | 9/1929 | Blankenship et al. |
| 1,742,985 A | 1/1930 | Burnham |
| 1,747,507 A | 2/1930 | George |
| 1,756,672 A | 4/1930 | Barr |

(List continued on next page.)

FOREIGN PATENT DOCUMENTS

| | | |
|---|---|---|
| AT | 399790 | 7/1995 |
| BE | 565063 | 2/1957 |
| CH | 391071 | 4/1965 |
| CH | SU 266037 | 10/1965 |
| CH | 534448 | 2/1973 |
| CH | 539328 | 7/1973 |
| CH | SU 646403 | 2/1979 |
| CH | 657482 | 8/1986 |
| CH | SU 1189322 | 10/1986 |
| DE | 40414 | 8/1887 |

(List continued on next page.)

OTHER PUBLICATIONS

A test installation of a self–tuned ac filter in the Konti–Skan 2 HVDC link; T. Holmgren, G. Asplund, S. Valdemarsson, P. Hidman of ABB; U. Jonsson of Svenska Kraftnat; O. loof of Vattenfall Vastsverige AB; IEEE Stockholm Power Tech Conference Jun. 1995, pp 64–70.

(List continued on next page.)

Primary Examiner—Burton Mullins
(74) Attorney, Agent, or Firm—Oblon, Spivak, McClelland, Maier & Neustadt, P.C.

(57) ABSTRACT

The magnetic circuit of a synchronous compensator plant is included in an electric machine which is directly connected to a high supply voltage of 20–800 kV, preferably higher than 36 kV. The electric machine is provided with solid insulation and its winding(s) is/are built up of a cable (6) intended for high voltage comprising one or more current-carrying conductors (31) with a number of strands (36) surrounded by at least one outer and one inner semiconducting layer (34, 32) and intermediate insulating layers (33). The plant is made as a mobile unit.

37 Claims, 3 Drawing Sheets

U.S. PATENT DOCUMENTS

| | | |
|---|---|---|
| 1,762,775 A | 6/1930 | Ganz |
| 1,781,308 A | 11/1930 | Vos |
| 1,861,182 A | 5/1932 | Hendey et al. |
| 1,904,885 A | 4/1933 | Seeley |
| 1,974,406 A | 9/1934 | Apple et al. |
| 2,006,170 A | 6/1935 | Juhlin |
| 2,206,856 A | 7/1940 | Shearer |
| 2,217,430 A | 10/1940 | Baudry |
| 2,241,832 A | 5/1941 | Wahlquist |
| 2,251,291 A | 8/1941 | Reichelt |
| 2,256,897 A | 9/1941 | Davidson et al. |
| 2,295,415 A | 9/1942 | Monroe |
| 2,409,893 A | 10/1946 | Pendleton et al. |
| 2,415,652 A | 2/1947 | Norton |
| 2,424,443 A | 7/1947 | Evans |
| 2,436,306 A | 2/1948 | Johnson |
| 2,446,999 A | 8/1948 | Camilli |
| 2,459,322 A | 1/1949 | Johnston |
| 2,462,651 A | 2/1949 | Lord |
| 2,498,238 A | 2/1950 | Berberich et al. |
| 2,650,350 A | 8/1953 | Heath |
| 2,721,905 A | 10/1955 | Monroe |
| 2,749,456 A | 6/1956 | Luenberger |
| 2,780,771 A | 2/1957 | Lee |
| 2,846,599 A | 8/1958 | McAdam |
| 2,885,581 A | 5/1959 | Pileggi |
| 2,943,242 A | 6/1960 | Schaschl et al. |
| 2,947,957 A | 8/1960 | Spindler |
| 2,959,699 A | 11/1960 | Smith et al. |
| 2,962,679 A | 11/1960 | Stratton |
| 2,975,309 A | 3/1961 | Seidner |
| 3,014,139 A | 12/1961 | Shildneck |
| 3,098,893 A | 7/1963 | Pringle et al. |
| 3,130,335 A | 4/1964 | Rejda |
| 3,143,269 A | 8/1964 | Van Eldik |
| 3,157,806 A | 11/1964 | Wiedemann |
| 3,158,770 A | 11/1964 | Coggeshall et al. |
| 3,197,723 A | 7/1965 | Dortort |
| 3,268,766 A | 8/1966 | Amos |
| 3,304,599 A | 2/1967 | Nordin |
| 3,354,331 A | 11/1967 | Broeker et al. |
| 3,365,657 A | 1/1968 | Webb |
| 3,372,283 A | 3/1968 | Jaecklin |
| 3,392,779 A | 7/1968 | Tilbrook |
| 3,411,027 A | 11/1968 | Rosenberg |
| 3,418,530 A | 12/1968 | Cheever |
| 3,435,262 A | 3/1969 | Bennett et al. |
| 3,437,858 A | 4/1969 | White |
| 3,444,407 A | 5/1969 | Yates |
| 3,447,002 A | 5/1969 | Ronnevig |
| 3,484,690 A | 12/1969 | Wald |
| 3,541,221 A | 11/1970 | Aupoix et al. |
| 3,560,777 A | 2/1971 | Moeller |
| 3,571,690 A | 3/1971 | Lataisa |
| 3,593,123 A | 7/1971 | Williamson |
| 3,631,519 A | 12/1971 | Salahshourian |
| 3,644,662 A | 2/1972 | Salahshourian |
| 3,651,244 A | 3/1972 | Silver et al. |
| 3,651,402 A | 3/1972 | Leftmann |
| 3,660,721 A | 5/1972 | Baird |
| 3,666,876 A | 5/1972 | Forster |
| 3,670,192 A | 6/1972 | Andersson et al. |
| 3,675,056 A | 7/1972 | Lenz |
| 3,684,821 A | 8/1972 | Miyauchi et al. |
| 3,684,906 A | 8/1972 | Lexz |
| 3,699,238 A | 10/1972 | Hansen et al. |
| 3,716,652 A | 2/1973 | Lusk et al. |
| 3,716,719 A | 2/1973 | Angelery et al. |
| 3,727,085 A | 4/1973 | Goetz et al. |
| 3,740,600 A | 6/1973 | Turley |
| 3,743,867 A | 7/1973 | Smith, Jr. |
| 3,746,954 A | 7/1973 | Myles et al. |
| 3,758,699 A | 9/1973 | Lusk et al. |
| 3,778,891 A | 12/1973 | Amasino et al. |
| 3,781,739 A | 12/1973 | Meyer |
| 3,787,607 A | 1/1974 | Schlafly |
| 3,792,399 A | 2/1974 | McLyman |
| 3,801,843 A | 4/1974 | Corman et al. |
| 3,809,933 A | 5/1974 | Sugawara et al. |
| 3,813,764 A | 6/1974 | Tanaka et al. |
| 3,820,048 A | 6/1974 | Ohta et al. |
| 3,828,115 A | 8/1974 | Hvizd, Jr. |
| 3,881,647 A | 5/1975 | Wolfe |
| 3,884,154 A | 5/1975 | Marten |
| 3,891,880 A | 6/1975 | Britsch |
| 3,902,000 A | 8/1975 | Forsyth et al. |
| 3,912,957 A | 10/1975 | Reynolds |
| 3,932,779 A | 1/1976 | Madsen |
| 3,932,791 A | 1/1976 | Oswald |
| 3,943,392 A | 3/1976 | Keuper et al. |
| 3,947,278 A | 3/1976 | Youtsey |
| 3,965,408 A | 6/1976 | Higuchi et al. |
| 3,968,388 A | 7/1976 | Lambrecht et al. |
| 3,971,543 A | 7/1976 | Shanahan |
| 3,974,314 A | 8/1976 | Fuchs |
| 3,993,860 A | 11/1976 | Snow et al. |
| 3,995,785 A | 12/1976 | Arick et al. |
| 4,001,616 A | 1/1977 | Lonseth et al. |
| 4,008,367 A | 2/1977 | Sunderhauf |
| 4,008,409 A | 2/1977 | Rhudy et al. |
| 4,031,310 A | 6/1977 | Jachimowicz |
| 4,039,740 A | 8/1977 | Iwata |
| 4,041,431 A | 8/1977 | Enoksen |
| 4,047,138 A | 9/1977 | Steigerwald |
| 4,064,419 A | 12/1977 | Peterson |
| 4,084,307 A | 4/1978 | Schultz et al. |
| 4,085,347 A | 4/1978 | Lichius |
| 4,088,953 A | 5/1978 | Sarian |
| 4,091,138 A | 5/1978 | Takagi et al. |
| 4,091,139 A | 5/1978 | Quirk |
| 4,099,227 A | 7/1978 | Liptak |
| 4,103,075 A | 7/1978 | Adam |
| 4,106,069 A | 8/1978 | Trautner et al. |
| 4,107,092 A | 8/1978 | Carnahan et al. |
| 4,109,098 A | 8/1978 | Olsson et al. |
| 4,121,148 A | 10/1978 | Platzer |
| 4,132,914 A | 1/1979 | Khutoretsky et al. |
| 4,134,036 A | 1/1979 | Curtiss |
| 4,134,055 A | 1/1979 | Akamatsu |
| 4,134,146 A | 1/1979 | Stetson |
| 4,149,101 A | 4/1979 | Lesokhin et al. |
| 4,152,615 A | 5/1979 | Calfo et al. |
| 4,160,193 A | 7/1979 | Richmond |
| 4,164,672 A | 8/1979 | Flick |
| 4,164,772 A | 8/1979 | Hingorani |
| 4,177,397 A | 12/1979 | Lill |
| 4,177,418 A | 12/1979 | Brueckner et al. |
| 4,184,186 A | 1/1980 | Barkan |
| 4,200,817 A | 4/1980 | Bratoljic |
| 4,200,818 A | 4/1980 | Ruffing et al. |
| 4,206,434 A | 6/1980 | Hase |
| 4,207,427 A | 6/1980 | Beretta et al. |
| 4,207,482 A | 6/1980 | Neumeyer et al. |
| 4,208,597 A | 6/1980 | Mulach et al. |
| 4,229,721 A | 10/1980 | Koloczek et al. |
| 4,238,339 A | 12/1980 | Khutoretsky et al. |
| 4,239,999 A | 12/1980 | Vinokurov et al. |
| 4,245,182 A | 1/1981 | Aotsu et al. |
| 4,246,694 A | 1/1981 | Raschbichler et al. |
| 4,255,684 A | 3/1981 | Mischler et al. |
| 4,258,280 A | 3/1981 | Starcevic |

| | | | | | | |
|---|---|---|---|---|---|---|
| 4,262,209 A | 4/1981 | Berner | | 4,618,795 A | 10/1986 | Cooper et al. |
| 4,274,027 A | 6/1981 | Higuchi et al. | | 4,619,040 A | 10/1986 | Wang et al. |
| 4,281,264 A | 7/1981 | Keim et al. | | 4,622,116 A | 11/1986 | Elton et al. |
| 4,292,558 A | 9/1981 | Flick et al. | | 4,633,109 A | 12/1986 | Feigel |
| 4,307,311 A | 12/1981 | Grozinger | | 4,650,924 A | 3/1987 | Kauffman et al. |
| 4,308,476 A | 12/1981 | Schuler | | 4,652,963 A | 3/1987 | Fahlen |
| 4,308,575 A | 12/1981 | Mase | | 4,656,316 A | 4/1987 | Meltsch |
| 4,310,966 A | 1/1982 | Breitenbach | | 4,656,379 A | 4/1987 | McCarty |
| 4,314,168 A | 2/1982 | Breitenbach | | 4,663,603 A | 5/1987 | van Riemsdijk et al. |
| 4,317,001 A | 2/1982 | Silver et al. | | 4,677,328 A | 6/1987 | Kumakura |
| 4,320,645 A | 3/1982 | Stanley | | 4,687,882 A | 8/1987 | Stone et al. |
| 4,321,426 A | 3/1982 | Schaeffer et al. | | 4,692,731 A | 9/1987 | Osinga |
| 4,321,518 A | 3/1982 | Akamatsu | | 4,723,083 A | 2/1988 | Elton |
| 4,326,181 A | 4/1982 | Allen | | 4,723,104 A | 2/1988 | Rohatyn |
| 4,330,726 A | 5/1982 | Albright et al. | | 4,724,345 A | 2/1988 | Elton et al. |
| 4,337,922 A | 7/1982 | Streiff et al. | | 4,732,412 A | 3/1988 | van der Linden et al. |
| 4,341,989 A | 7/1982 | Sandberg et al. | | 4,737,704 A | 4/1988 | Kalinnikov et al. |
| 4,347,449 A | 8/1982 | Beau | | 4,745,314 A | 5/1988 | Nakano |
| 4,347,454 A | 8/1982 | Gellert et al. | | 4,761,602 A | 8/1988 | Leibovich |
| 4,353,612 A | 10/1982 | Meyers | | 4,766,365 A | 8/1988 | Bolduc et al. |
| 4,357,542 A | 11/1982 | Kirschbaum | | 4,771,168 A | 9/1988 | Gundersen et al. |
| 4,360,748 A | 11/1982 | Raschbichler et al. | | 4,785,138 A | 11/1988 | Breitenbach et al. |
| 4,361,723 A | 11/1982 | Hvizd, Jr. et al. | | 4,795,933 A | 1/1989 | Sakai |
| 4,365,178 A | 12/1982 | Lexz | | 4,827,172 A | 5/1989 | Kobayashi |
| 4,367,425 A | 1/1983 | Mendelsohn et al. | | 4,845,308 A | 7/1989 | Womack, Jr. et al. |
| 4,367,890 A | 1/1983 | Spirk | | 4,847,747 A | 7/1989 | Abbondanti |
| 4,368,418 A | 1/1983 | Demello et al. | | 4,853,565 A | 8/1989 | Elton et al. |
| 4,369,389 A | 1/1983 | Lambrecht | | 4,859,810 A | 8/1989 | Cloetens et al. |
| 4,371,745 A | 2/1983 | Sakashita | | 4,859,989 A | 8/1989 | McPherson |
| 4,384,944 A | 5/1983 | Silver et al. | | 4,860,430 A | 8/1989 | Raschbichler et al. |
| 4,387,316 A | 6/1983 | Katsekas | | 4,864,266 A | 9/1989 | Feather et al. |
| 4,401,920 A | 8/1983 | Taylor et al. | | 4,883,230 A | 11/1989 | Lindstrom |
| 4,403,163 A | 9/1983 | Rarmerding et al. | | 4,890,040 A | 12/1989 | Gundersen |
| 4,404,486 A | 9/1983 | Keim et al. | | 4,894,284 A | 1/1990 | Yamanouchi et al. |
| 4,411,710 A | 10/1983 | Mochizuki et al. | | 4,914,386 A | 4/1990 | Zocholl |
| 4,421,284 A | 12/1983 | Pan | | 4,918,347 A | 4/1990 | Takaba |
| 4,425,521 A | 1/1984 | Rosenberry, Jr. et al. | | 4,918,835 A | 4/1990 | Wcislo et al. |
| 4,426,771 A | 1/1984 | Wang et al. | | 4,924,342 A | 5/1990 | Lee |
| 4,429,244 A | 1/1984 | Nikiten et al. | | 4,926,079 A | 5/1990 | Niemela et al. |
| 4,431,960 A | 2/1984 | Zucker | | 4,942,326 A | 7/1990 | Butler, III et al. |
| 4,432,029 A | 2/1984 | Lundqvist | | 4,949,001 A | 8/1990 | Campbell |
| 4,437,464 A | 3/1984 | Crow | | 4,982,147 A | 1/1991 | Lauw |
| 4,443,725 A | 4/1984 | Derderian et al. | | 4,994,952 A | 2/1991 | Silva et al. |
| 4,470,884 A | 9/1984 | Carr | | 4,997,995 A | 3/1991 | Simmons et al. |
| 4,473,765 A | 9/1984 | Butman, Jr. et al. | | 5,012,125 A | 4/1991 | Conway |
| 4,475,075 A | 10/1984 | Munn | | 5,030,813 A | 7/1991 | Stanisz |
| 4,477,690 A | 10/1984 | Nikitin et al. | | 5,036,165 A | 7/1991 | Elton et al. |
| 4,481,438 A | 11/1984 | Keim | | 5,036,238 A | 7/1991 | Tajima |
| 4,484,106 A | 11/1984 | Taylor et al. | | 5,066,881 A | 11/1991 | Elton et al. |
| 4,488,079 A | 12/1984 | Dailey et al. | | 5,067,046 A | 11/1991 | Elton et al. |
| 4,490,651 A | 12/1984 | Taylor et al. | | 5,083,360 A | 1/1992 | Valencic et al. |
| 4,503,284 A | 3/1985 | Minnick et al. | | 5,086,246 A | 2/1992 | Dymond et al. |
| 4,508,251 A | 4/1985 | Harada et al. | | 5,091,609 A | 2/1992 | Sawada et al. |
| 4,510,077 A | 4/1985 | Elton | | 5,094,703 A | 3/1992 | Takaoka et al. |
| 4,517,471 A | 5/1985 | Sachs | | 5,095,175 A | 3/1992 | Yoshida et al. |
| 4,520,287 A | 5/1985 | Wang et al. | | 5,097,241 A | 3/1992 | Smith et al. |
| 4,523,249 A | 6/1985 | Arimoto | | 5,097,591 A | 3/1992 | Wcislo et al. |
| 4,538,131 A | 8/1985 | Baier et al. | | 5,111,095 A | 5/1992 | Hendershot |
| 4,546,210 A | 10/1985 | Akiba et al. | | 5,124,607 A | 6/1992 | Rieber et al. |
| 4,551,780 A | 11/1985 | Canay | | 5,136,459 A | 8/1992 | Fararooy |
| 4,552,990 A | 11/1985 | Persson et al. | | 5,140,290 A | 8/1992 | Dersch |
| 4,557,038 A | 12/1985 | Wcislo et al. | | 5,153,460 A | 10/1992 | Bovino et al. |
| 4,560,896 A | 12/1985 | Vogt et al. | | 5,168,662 A | 12/1992 | Nakamura et al. |
| 4,565,929 A | 1/1986 | Baskin et al. | | 5,171,941 A | 12/1992 | Shimizu et al. |
| 4,571,453 A | 2/1986 | Takaoka et al. | | 5,175,396 A | 12/1992 | Emery et al. |
| 4,588,916 A | 5/1986 | Lis | | 5,182,537 A | 1/1993 | Thuis |
| 4,590,416 A | 5/1986 | Porche et al. | | 5,187,428 A | 2/1993 | Hutchison et al. |
| 4,594,630 A | 6/1986 | Rabinowitz et al. | | 5,231,249 A | 7/1993 | Kimura et al. |
| 4,607,183 A | 8/1986 | Rieber et al. | | 5,235,488 A | 8/1993 | Koch |
| 4,615,109 A | 10/1986 | Wcislo et al. | | 5,246,783 A | 9/1993 | Spenadel et al. |
| 4,615,778 A | 10/1986 | Elton | | 5,264,778 A | 11/1993 | Kimmel et al. |

| | | | | | | |
|---|---|---|---|---|---|---|
| 5,287,262 A | 2/1994 | Klein | | DE | 1807391 | 5/1970 |
| 5,293,146 A | 3/1994 | Aosaki et al. | | DE | 2050674 | 5/1971 |
| 5,304,883 A | 4/1994 | Denk | | DE | 1638176 | 6/1971 |
| 5,305,961 A | 4/1994 | Errard et al. | | DE | 2155371 | 5/1973 |
| 5,321,308 A | 6/1994 | Johncock | | DE | 2400698 | 7/1975 |
| 5,323,330 A | 6/1994 | Asplund et al. | | DE | 2520511 | 11/1976 |
| 5,325,008 A | 6/1994 | Grant | | DE | 2656389 | 6/1978 |
| 5,325,259 A | 6/1994 | Paulsson | | DE | 2721905 | 11/1978 |
| 5,327,637 A | 7/1994 | Britenbach et al. | | DE | 137164 | 8/1979 |
| 5,341,281 A | 8/1994 | Skibinski | | DE | 138840 | 11/1979 |
| 5,343,139 A | 8/1994 | Gyugyi et al. | | DE | 2824951 | 12/1979 |
| 5,355,046 A | 10/1994 | Weigelt | | DE | 2835386 | 2/1980 |
| 5,365,132 A | 11/1994 | Hann et al. | | DE | 2839517 | 3/1980 |
| 5,387,890 A | 2/1995 | Estop et al. | | DE | 2854520 | 6/1980 |
| 5,397,513 A | 3/1995 | Steketee, Jr. | | DE | 3009102 | 9/1980 |
| 5,399,941 A | 3/1995 | Grothaus et al. | | DE | 2913697 | 10/1980 |
| 5,400,005 A | 3/1995 | Bobry | | DE | 2920478 | 12/1980 |
| 5,408,169 A | 4/1995 | Jeanneret | | DE | 3028777 | 3/1981 |
| 5,449,861 A | 9/1995 | Fujino et al. | | DE | 2939004 | 4/1981 |
| 5,452,170 A | 9/1995 | Ohde et al. | | DE | 3006382 | 8/1981 |
| 5,468,916 A | 11/1995 | Litenas et al. | | DE | 3008818 | 9/1981 |
| 5,499,178 A | 3/1996 | Mohan | | DE | 209313 | 4/1984 |
| 5,500,632 A | 3/1996 | Halser, III | | DE | 3305225 | 8/1984 |
| 5,510,942 A | 4/1996 | Bock et al. | | DE | 3309051 | 9/1984 |
| 5,530,307 A | 6/1996 | Horst | | DE | 3441311 | 5/1986 |
| 5,533,658 A | 7/1996 | Benedict et al. | | DE | 3543106 | 6/1987 |
| 5,534,754 A | 7/1996 | Poumey | | DE | 2917717 | 8/1987 |
| 5,545,853 A | 8/1996 | Hildreth | | DE | 3612112 | 10/1987 |
| 5,550,410 A | 8/1996 | Titus | | DE | 3726346 | 2/1989 |
| 5,583,387 A | 12/1996 | Takeuchi et al. | | DE | 3925337 | 2/1991 |
| 5,587,126 A | 12/1996 | Steketee, Jr. | | DE | 4023903 | 11/1991 |
| 5,598,137 A | 1/1997 | Alber et al. | | DE | 4022476 | 1/1992 |
| 5,607,320 A | 3/1997 | Wright | | DE | 4233558 | 3/1994 |
| 5,612,510 A | 3/1997 | Hildreth | | DE | 4402184 | 8/1995 |
| 5,663,605 A | 9/1997 | Evans et al. | | DE | 4409794 | 8/1995 |
| 5,672,926 A | 9/1997 | Brandes et al. | | DE | 4412761 | 10/1995 |
| 5,689,223 A | 11/1997 | Demarmels et al. | | DE | 4420322 | 12/1995 |
| 5,807,447 A | 9/1998 | Forrest | | DE | 19620906 | 1/1996 |
| 5,834,699 A | 11/1998 | Buck et al. | | DE | 4438186 | 5/1996 |
| | | | | DE | 19020222 | 3/1997 |
| | | | | DE | 19547229 | 6/1997 |

FOREIGN PATENT DOCUMENTS

| | | | |
|---|---|---|---|
| DE | 277012 | 7/1914 | |
| DE | 336418 | 6/1920 | |
| DE | 372390 | 3/1923 | |
| DE | 386561 | 12/1923 | |
| DE | 387973 | 1/1924 | |
| DE | 406371 | 11/1924 | |
| DE | 424551 | 2/1926 | |
| DE | 426793 | 3/1926 | |
| DE | 432169 | 7/1926 | |
| DE | 433749 | 9/1926 | |
| DE | 435608 | 10/1926 | |
| DE | 435609 | 10/1926 | |
| DE | 441717 | 3/1927 | |
| DE | 443011 | 4/1927 | |
| DE | 460124 | 5/1928 | |
| DE | 482506 | 9/1929 | |
| DE | 501181 | 7/1930 | |
| DE | 523047 | 4/1931 | |
| DE | 568508 | 1/1933 | |
| DE | 572030 | 3/1933 | |
| DE | 584639 | 9/1933 | |
| DE | 586121 | 10/1933 | |
| DE | 604972 | 11/1934 | |
| DE | 629301 | 4/1936 | |
| DE | 673545 | 3/1939 | |
| DE | 719009 | 3/1942 | |
| DE | 846583 | 8/1952 | |
| DE | 875227 | 4/1953 | |
| DE | 975999 | 1/1963 | |
| DE | 1465719 | 5/1969 | |

| | | |
|---|---|---|
| DE | 468827 | 7/1997 |
| DE | 134022 | 12/2001 |
| EP | 049104 | 4/1982 |
| EP | 0493704 | 4/1982 |
| EP | 0056580 A1 | 7/1982 |
| EP | 078908 | 5/1983 |
| EP | 0120154 | 10/1984 |
| EP | 0130124 | 1/1985 |
| EP | 0142813 | 5/1985 |
| EP | 0155405 | 9/1985 |
| EP | 0102513 | 1/1986 |
| EP | 0174783 | 3/1986 |
| EP | 0185788 | 7/1986 |
| EP | 0277358 | 8/1986 |
| EP | 0234521 | 9/1987 |
| EP | 0244069 | 11/1987 |
| EP | 0246377 | 11/1987 |
| EP | 0265868 | 5/1988 |
| EP | 0274691 | 7/1988 |
| EP | 0280759 | 9/1988 |
| EP | 0282876 | 9/1988 |
| EP | 0309096 | 3/1989 |
| EP | 0314860 | 5/1989 |
| EP | 0316911 | 5/1989 |
| EP | 0317248 | 5/1989 |
| EP | 0335430 | 10/1989 |
| EP | 0342554 | 11/1989 |
| EP | 0221404 | 5/1990 |
| EP | 0375101 | 6/1990 |
| EP | 0406437 | 1/1991 |

| | | | | | | |
|---|---|---|---|---|---|---|
| EP | 0439410 | 7/1991 | | GB | 1135242 | 12/1968 |
| EP | 0440865 | 8/1991 | | GB | 1147049 | 4/1969 |
| EP | 0469155 A1 | 2/1992 | | GB | 1157885 | 7/1969 |
| EP | 0490705 | 6/1992 | | GB | 1174659 | 12/1969 |
| EP | 0503817 | 9/1992 | | GB | 1236082 | 6/1971 |
| EP | 0571155 | 11/1993 | | GB | 1268770 | 3/1972 |
| EP | 0620570 | 10/1994 | | GB | 1319257 | 6/1973 |
| EP | 0620630 | 10/1994 | | GB | 1322433 | 7/1973 |
| EP | 0642027 | 3/1995 | | GB | 1340983 | 12/1973 |
| EP | 0671632 | 9/1995 | | GB | 1341050 | 12/1973 |
| EP | 0676777 | 10/1995 | | GB | 1365191 | 8/1974 |
| EP | 0677915 | 10/1995 | | GB | 1395152 | 5/1975 |
| EP | 0684679 | 11/1995 | | GB | 1424982 | 2/1976 |
| EP | 0684682 | 11/1995 | | GB | 1426594 | 3/1976 |
| EP | 0695019 | 1/1996 | | GB | 1438610 | 6/1976 |
| EP | 0732787 | 9/1996 | | GB | 1445284 | 8/1976 |
| EP | 0738034 | 10/1996 | | GB | 1479904 | 7/1977 |
| EP | 0739087 A2 | 10/1996 | | GB | 1493163 | 11/1977 |
| EP | 0740315 | 10/1996 | | GB | 1502938 | 3/1978 |
| EP | 0749190 A2 | 12/1996 | | GB | 1525745 | 9/1978 |
| EP | 0751605 | 1/1997 | | GB | 2000625 | 1/1979 |
| EP | 0739087 A3 | 3/1997 | | GB | 1548633 | 7/1979 |
| EP | 0749193 A3 | 3/1997 | | GB | 2046142 | 11/1979 |
| EP | 0780926 | 6/1997 | | GB | 2022327 | 12/1979 |
| EP | 0802542 | 10/1997 | | GB | 2025150 | 1/1980 |
| EP | 0913912 A1 | 5/1999 | | GB | 2034101 | 5/1980 |
| FR | 805544 | 4/1936 | | GB | 1574796 | 9/1980 |
| FR | 841351 | 1/1938 | | GB | 2070341 | 9/1981 |
| FR | 847899 | 12/1938 | | GB | 2070470 | 9/1981 |
| FR | 916959 | 12/1946 | | GB | 2071433 | 9/1981 |
| FR | 1011924 | 4/1949 | | GB | 2081523 | 2/1982 |
| FR | 1126975 | 3/1955 | | GB | 2099635 | 12/1982 |
| FR | 1238795 | 7/1959 | | GB | 2105925 | 3/1983 |
| FR | 2108171 | 5/1972 | | GB | 2106306 | 4/1983 |
| FR | 2251938 | 6/1975 | | GB | 2106721 | 4/1983 |
| FR | 2305879 | 10/1976 | | GB | 2136214 | 9/1984 |
| FR | 2376542 | 7/1978 | | GB | 2140195 | 11/1984 |
| FR | 2467502 | 4/1981 | | GB | 2150153 | 6/1985 |
| FR | 2481531 | 10/1981 | | GB | 2268337 | 1/1994 |
| FR | 2556146 | 6/1985 | | GB | 2273819 | 6/1994 |
| FR | 2594271 | 8/1987 | | GB | 2283133 | 4/1995 |
| FR | 2708157 | 1/1995 | | GB | 2289992 | 12/1995 |
| GB | 123906 | 3/1919 | | GB | 2308490 | 6/1997 |
| GB | 268271 | 3/1927 | | GB | 2332557 | 6/1999 |
| GB | 293861 | 11/1928 | | HU | 175494 | 11/1981 |
| GB | 292999 | 4/1929 | | JP | WO8115862 | 10/1919 |
| GB | 319313 | 7/1929 | | JP | 60206121 | 3/1959 |
| GB | 518993 | 3/1940 | | JP | 57043529 | 8/1980 |
| GB | 537609 | 6/1941 | | JP | 57126117 | 5/1982 |
| GB | 540456 | 10/1941 | | JP | 59076156 | 10/1982 |
| GB | 589071 | 6/1947 | | JP | 59159642 | 2/1983 |
| GB | 666883 | 2/1952 | | JP | 6264964 | 9/1985 |
| GB | 685416 | 1/1953 | | JP | 1129737 | 5/1989 |
| GB | 702892 | 1/1954 | | JP | 62320631 | 6/1989 |
| GB | 715226 | 9/1954 | | JP | 2017474 | 1/1990 |
| GB | 723457 | 2/1955 | | JP | 3245748 | 2/1990 |
| GB | 739962 | 11/1955 | | JP | 4179107 | 11/1990 |
| GB | 763761 | 12/1956 | | JP | 318253 | 1/1991 |
| GB | 805721 | 12/1958 | | JP | 424909 | 1/1992 |
| GB | 827600 | 2/1960 | | JP | 5290947 | 4/1992 |
| GB | 854728 | 11/1960 | | JP | 6196343 | 12/1992 |
| GB | 870583 | 6/1961 | | JP | 6233442 | 2/1993 |
| GB | 913386 | 12/1962 | | JP | 6325629 | 5/1993 |
| GB | 965741 | 8/1964 | | JP | 7057951 | 8/1993 |
| GB | 992249 | 5/1965 | | JP | 7264789 | 3/1994 |
| GB | 1024583 | 3/1966 | | JP | 8167332 | 12/1994 |
| GB | 1053337 | 12/1966 | | JP | 7161270 | 6/1995 |
| GB | 1059123 | 2/1967 | | JP | 8264039 | 11/1995 |
| GB | 1103098 | 2/1968 | | JP | 9200989 | 1/1996 |
| GB | 1103099 | 2/1968 | | JP | 8036952 | 2/1996 |
| GB | 1117401 | 6/1968 | | JP | 8167360 | 6/1996 |

| | | | | | |
|---|---|---|---|---|---|
| LU | 67199 | 3/1972 | WO | WO9745938 | 12/1997 |
| SE | 90308 | 9/1937 | WO | WO9745939 | 12/1997 |
| SE | 305899 | 11/1968 | WO | WO9747067 | 12/1997 |
| SE | 255156 | 2/1969 | WO | WO9820595 | 5/1998 |
| SE | 341428 | 12/1971 | WO | WO9820596 | 5/1998 |
| SE | 453236 | 1/1982 | WO | WO9820597 | 5/1998 |
| SE | 457792 | 6/1987 | WO | WO 98/20598 | 5/1998 |
| SE | 502417 | 12/1993 | WO | WO9820600 | 5/1998 |
| SU | 792302 | 1/1971 | WO | WO 98/20602 | 5/1998 |
| SU | 425268 | 9/1974 | WO | WO9821385 | 5/1998 |
| SU | 1019553 | 1/1980 | WO | PCT/FR 98/00468 | 6/1998 |
| SU | 694939 | 1/1982 | WO | WO9827634 | 6/1998 |
| SU | 955369 | 8/1983 | WO | WO9827635 | 6/1998 |
| SU | 1511810 | 5/1987 | WO | WO9827636 | 6/1998 |
| WO | WO8202617 | 8/1982 | WO | WO9829927 | 7/1998 |
| WO | WO8502302 | 5/1985 | WO | WO9829928 | 7/1998 |
| WO | WO9011389 | 10/1990 | WO | WO9829929 | 7/1998 |
| WO | WO9012409 | 10/1990 | WO | WO9829930 | 7/1998 |
| WO | PCT/DE 90/00279 | 11/1990 | WO | WO9829931 | 7/1998 |
| WO | WO9101059 | 1/1991 | WO | WO9829932 | 7/1998 |
| WO | WO91101585 | 2/1991 | WO | WO9833731 | 8/1998 |
| WO | WO9107807 | 3/1991 | WO | WO9833736 | 8/1998 |
| WO | PCT SE 91/00077 | 4/1991 | WO | WO9833737 | 8/1998 |
| WO | WO9109442 | 6/1991 | WO | WO9834238 | 8/1998 |
| WO | WO 91/11841 | 8/1991 | WO | WO 98/34239 | 8/1998 |
| WO | WO 91/15755 | 10/1991 | WO | WO9834240 | 8/1998 |
| WO | WO9201328 | 1/1992 | WO | WO9834241 | 8/1998 |
| WO | WO9203870 | 3/1992 | WO | WO9834242 | 8/1998 |
| WO | WO9321681 | 10/1993 | WO | WO9834243 | 8/1998 |
| WO | WO9406194 | 3/1994 | WO | WO9834244 | 8/1998 |
| WO | WO9518058 | 7/1995 | WO | WO9834245 | 8/1998 |
| WO | WO9522153 | 8/1995 | WO | WO9834246 | 8/1998 |
| WO | WO9524049 | 9/1995 | WO | WO9834247 | 8/1998 |
| WO | WO9622606 | 7/1996 | WO | WO9834248 | 8/1998 |
| WO | WO9622607 | 7/1996 | WO | WO9834249 | 8/1998 |
| WO | PCT/CN 96/00010 | 10/1996 | WO | WO9834250 | 8/1998 |
| WO | WO9630144 | 10/1996 | WO | WO9834309 | 8/1998 |
| WO | WO9710640 | 3/1997 | WO | WO9834312 | 8/1998 |
| WO | WO9711831 | 4/1997 | WO | WO9834315 | 8/1998 |
| WO | WO9716881 | 5/1997 | WO | WO9834321 | 8/1998 |
| WO | WO 97/29494 | 8/1997 | WO | WO9834322 | 8/1998 |
| WO | WO9745288 | 12/1997 | WO | WO9834323 | 8/1998 |
| WO | WO9745847 | 12/1997 | WO | WO9834325 | 8/1998 |
| WO | WO9745848 | 12/1997 | WO | WO9834326 | 8/1998 |
| WO | WO9745906 | 12/1997 | WO | WO9834328 | 8/1998 |
| WO | WO9745907 | 12/1997 | WO | WO9834329 | 8/1998 |
| WO | WO 97/45908 | 12/1997 | WO | WO9834330 | 8/1998 |
| WO | WO9745912 | 12/1997 | WO | WO9834331 | 8/1998 |
| WO | WO9745914 | 12/1997 | WO | WO9883427 | 8/1998 |
| WO | WO9745915 | 12/1997 | WO | WO 98/40627 | 9/1998 |
| WO | WO9745916 | 12/1997 | WO | WO 98/43336 | 10/1998 |
| WO | WO9745918 | 12/1997 | WO | WO9917309 | 4/1999 |
| WO | WO9745919 | 12/1997 | WO | WO9917311 | 4/1999 |
| WO | WO9745920 | 12/1997 | WO | WO9917312 | 4/1999 |
| WO | WO9745921 | 12/1997 | WO | WO9917313 | 4/1999 |
| WO | WO9745922 | 12/1997 | WO | WO9917314 | 4/1999 |
| WO | WO9745923 | 12/1997 | WO | WO9917315 | 4/1999 |
| WO | WO9745924 | 12/1997 | WO | WO9917316 | 4/1999 |
| WO | WO9745925 | 12/1997 | WO | WO9917422 | 4/1999 |
| WO | WO9745926 | 12/1997 | WO | WO9917424 | 4/1999 |
| WO | WO9745927 | 12/1997 | WO | WO9917425 | 4/1999 |
| WO | WO9745928 | 12/1997 | WO | WO9917426 | 4/1999 |
| WO | WO9745929 | 12/1997 | WO | WO9917427 | 4/1999 |
| WO | WO9745930 | 12/1997 | WO | WO9917428 | 4/1999 |
| WO | WO9745931 | 12/1997 | WO | WO9917429 | 4/1999 |
| WO | WO9745932 | 12/1997 | WO | WO9917432 | 4/1999 |
| WO | WO9745933 | 12/1997 | WO | WO9917433 | 4/1999 |
| WO | WO9745934 | 12/1997 | WO | WO9919963 | 4/1999 |
| WO | WO9745935 | 12/1997 | WO | WO9919969 | 4/1999 |
| WO | WO9745936 | 12/1997 | WO | WO9919970 | 4/1999 |
| WO | WO9745937 | 12/1997 | WO | PCT/SE 98/02148 | 6/1999 |

| | | |
|---|---|---|
| WO | WO9927546 | 6/1999 |
| WO | WO9928919 | 6/1999 |
| WO | WO9928921 | 6/1999 |
| WO | WO 99/28922 | 6/1999 |
| WO | WO9928923 | 6/1999 |
| WO | WO9928924 | 6/1999 |
| WO | WO9928925 | 6/1999 |
| WO | WO9928926 | 6/1999 |
| WO | WO9928927 | 6/1999 |
| WO | WO9928928 | 6/1999 |
| WO | WO9928929 | 6/1999 |
| WO | WO9928930 | 6/1999 |
| WO | WO9928931 | 6/1999 |
| WO | WO9928934 | 6/1999 |
| WO | WO9928994 | 6/1999 |
| WO | WO 99/29005 | 6/1999 |
| WO | WO9929005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO 99/29023 | 6/1999 |
| WO | WO9929024 | 6/1999 |
| WO | WO 99/29025 | 6/1999 |
| WO | WO9929026 | 6/1999 |
| WO | WO9929029 | 6/1999 |
| WO | WO9929034 | 6/1999 |

OTHER PUBLICATIONS

Analysis of faulted Power Systems; P Anderson, Iowa State University Press / Ames, Iowa, 1973, pp 255–257.

36–Kv. Generators Arise from Insulation Research; P. Sidler; *Electrical World* Oct. 15, 1932, ppp 524.

Oil Water cooled 3000 MW turbine generator;L.P. Gnedin et al;*Elektrotechnika*, 1970, pp 6–8.

J&P Transformer Book $11^{th}$ Edition;A. C. Franklin et al; owned by Butterworth–Heinemann Ltd, Oxford Printed by Hartnolls Ltd in Great Britain 1983, pp29–67.

Transformerboard; H.P. Moser et al; 1979, pp 1–19.

The Skagerrak transmission—the world's longest HVDC submarine cable link; L. Haglof et al of ASEA; ASEA Journal vol. 53, No. 1–2, 1980, pp 3–12.

Direct Connection of Generators to HVDC Converters: Main Characteristics and Comparative Advantages; J.Arrillaga et al; *Electra* No. 149, Aug. 1993, pp 19–37.

Our flexible friend article; M. Judge; *New Scientist,* May 10, 1997, pp 44–48.

In–Service Performance of HVDC Converter transformers and oil–cooled smoothing reactors; G.L. Desilets et al; *Electra* No. 155, Aug. 1994, pp 7–29.

Transformateurs a courant continu haute tension–examen des specifications; A. Lindroth et al; *Electra* No. 141, Apr. 1992, pp 34–39.

Development of a Termination for the 77 kV–Class High Tc Superconducting Power Cable; T. Shimonosono et al; IEEE Power Delivery, vol. 12, No 1, Jan. 1997, pp 33–38.

Verification of Limiter Performance in Modern Excitation Control Systems; G. K. Girgis et al; IEEE Energy Conservation, vol. 10, No. 3, Sep. 1995, pp 538–542.

A High Initial response Brushless Excitation System; T. L., Dillman et al; IEEE Power Generation Winter Meeting Proceedings, Jan. 31, 1971, pp 2089–2094.

Design, manufacturing and cold test of a superconducting coil and its cryostat for SMES applications; A. Bautista et al; IEEE Applied Superconductivity, vol. 7, No. 2, Jun. 1997, pp 853–856.

Quench Protection and Stagnant Normal Zones in a Large Cryostable SMES; Y. Lvovsky et al; IEEE Applied Superconductivity, vol. 7, No. 2, Jun. 1997, pp 857–860.

Design and Construction of the 4 Tesla Background Coil for the Navy SMES Cable Test Apparatus; D.W.Scherbarth et al; IEEE Appliel Superconductivity, vol. 7, No. 2, Jun. 1997, pp 840–843.

High Speed Synchronous Motors Adjustable Speed Drives; ASEA Generation Pamphlet OG 135–101 E, Jan. 1985, pp 1–4.

Billig burk motar overtonen; A. Felldin; *ERA* (TEKNIK) Aug. 1994, pp 26–28.

400–kV XLPE cable system passes CIGRE test; ABB Article; ABB Review Sep. 1995, pp 38.

FREQSYN—a new drive system for high power applications;J–A. Bergman et al; ASEA Journal 59, Apr. 1986, pp16–19.

Canadians Create Conductive Concrete; J. Beaudoin et al; *Science,* vol. 276, May 23, 1997, pp 1201.

Fully Water–Cooled 190 MVA Generators in the Tonstad Hydroelectric Power Station; E. Ostby et al; BBC Review Aug. 1969, pp 380–385.

Relocatable static var compensators help control unbundled power flows; R. C. Knight et al; *Transmission & Distribution,* Dec. 1996, pp 49–54.

Investigation and Use of Asynchronized Machines in Power Systems*; N.I.Blotskii et al; *Elektrichestvo,* No. 12, 1–6, 1985, pp 90–99.

Variable–speed switched reluctance motors; P.J. Lawrenson et al; IEE proc, vol. 127, Pt.B, No. 4, Jul. 1980, pp 253–265.

Das Einphasenwechselstromsystem hoherer Frequenz; J.G. Heft; Fromische Bahnen eb; Dec. 1987, pp 388–389.

Power Transmission by Direct Current;E. Ulhlmann;ISBN 3–540–07122–9 Springer–Verlag, Berlin/Heidelberg/New York; 1975, pp 327–328.

Elektriska Maskiner; F. Gustavson; Institute for Elkreafteknilk, KTH: Stockholm, 1996, pp 3–6–3–12.

Die Wechselstromtechnik; A. Cour' Springer Verlag, Germany; 1936, pp 586–598.

Insulation systems for superconducting transmission cables; O.Toennesen; Nordic Insulation Symposium, Bergen, 1996, pp 425–432.

MPTC: An economical alternative to universal power flow controllers;N. Mohan; EPE 1997, Trondheim, pp 3.1027–3.1030.

Lexikon der Technik; Luger; Band 2, Grundlagen der Elektrotechnik und Kerntechnik, 1960, pp 395.

Das Handbuch der Lokomotiven ( hungarian locomotive V40 1'D'); B. Hollingsworth et al; Pawlak Verlagsgesellschaft; 1933, pp. 254–255.

Synchronous machines with single or double 3–phase star–connected winding fed by 12–pulse load commutated inverter. Simulation of operational behaviour; C. Ivarson et al; ICEM 1994, International Conference on electrical machines, vol. 1, pp 267–272.

Elkrafthandboken, Elamskiner; A. Rejminger; Elkrafthandboken, Elmaskiner 1996, 15–20.

Power Electronics—In Theory and Practice; K. Thorborg; ISBN 0-86238-341-2, 1993, pp 1-13.

Regulating transformers in power systems– new concepts and applications; E. Wirth et al; ABB Review Apr. 1997, p 12-20.

Tranforming transformers; S. Mehta et al; *IEEE Spectrum,* Jul. 1997, pp. 43-49.

A study of equipment sizes and constraints for a unified power flow controller; J. Bian et al; IEEE Transactions on Power Delivery, vol. 12, No. 3, Jul. 1997, pp. 1385-1391.

Industrial High Voltage; F.H. Kreuger; *Industrial High Voltage* 1991 vol. I, pp. 113-117.

Hochspannungstechnik; A. Küchler; Hochspannungstechnik; VDI Verlag 1996, pp. 365-366, ISBN 3-18-401530-0 or 3-540-62070-2.

High Voltage Engineering; N.S. Naidu; High Voltage Engineering ,second edition 1995 ISBN 0-07-462286-2, Chapter 5, pp91-98.

Performance Characteristics of a Wide Range Induction Type Frequency Converter; G.A. Ghoneem; Ieema Journal, Sep. 1995, pp 21-34.

International Electrotechnical Vocabulary, Chapter 551 Power Electronics;unknown author; International Electrotechnical Vocabulary Chapter 551: Power Electronics Bureau Central de la Commission Electrotechnique Internationale, Geneve; 1982, pp1-65.

Design and manufacture of a large superconductiung homopolar motor; A.D. Appleton; IEEE Transactions on Magnetics, vol. 19, No. 3, Part 2, May 1983, pp 1048-1050.

Application of high temperature superconductivity to electric motor design; J.S. Edmonds et al; IEEE Transactions on Energy Conversion Jun. 1992, No. 2 , pp 322-329.

Power Electronics and Variable Frequency Drives; B. Bimal; IEEE industrial Electronics—Technology and Applications, 1996, pp. 356.

Properties of High Plymer Cement Mortar; M. Tamai et al; *Science & Technology in Japan,* No 63; 1977, pp 6-14.

Weatherability of Polymer-Modified Mortars after Ten-Year Outdoor Exposure in Koriyama and Sapporo; Y. Ohama et al; *Science & Technology in Japan* No. 63; 1977, pp 26-31.

SMC Powders Open New Magnetic Applications; M. Persson (Editor); *SMC Update,* vol. 1, No. 1, Apr. 1997.

Characteristics of a laser triggered spark gap using air, Ar, CH4, H2, He, N2, SF6 and Xe; W.D. Kimura et al; Journal of Applied Physics, vol. 63, No 6, Mar. 15, 1988, p. 1882-1888.

Low-Intensy laser-triggering of rail-gaps with magnesium-aerosol switching-gases; W. Frey; 11th International Pulse Power Conference, 1997, Baltimore, USA Digest of Technical Papers, p. 322-327.

Shipboard Electrical Insulation; G. L. Moses, 1951, pp2&3.

ABB Elkrafthandbook; ABB AB; 1988 ; pp274-276.

Elkraft teknisk Handbok, 2 Elmaskiner; A. Alfredsson et al; 1988; pp 121-123.

High Voltage Cables in a New Class of Generators Powerformer; M. Leijon et al; Jun. 14, 1999; pp 1-8.

Ohne Tranformator direkt ins Netz; Owman et al, ABB, AB; Feb. 8, 1999; pp48-51.

Submersible Motors and Wet-Rotor Motors for Centrifugal Pumps Submerged in the Fluid Handled; K.. Bienick, KSB; Feb. 25, 1988; pp9-17.

High Voltage Generators; G. Beschastnov et al; 1977; vol. 48. No. 6 pp1-7.

Eine neue Type von Unterwassermotoren; Electrotechnik und Maschinenbam, 49; Aug. 1931; pp2-3.

Problems in design of the 110-5OokV high-voltage generators; Nikiti et al; World Electrotechnical Congress; 6/21-27/77; Section 1. Paper #18.

Manufacture and Testing of Roebel bars; P. Marti et al; 1960, Pub.86, vol. 8, pp 25-31.

Hydroalternators of 110 to 220 kV Elektrotechn. Obz., vol. 64, No. 3, pp132-136 Mar. 1975; A. Abramov.

Design Concepts for an Amorphous Metal Distribution Transformer; E. Boyd et al; IEEE 11/84.

Neue Wege zum Bau zweipoliger Turbogeneratoren bis 2 GVA, 6OkV Elektrotechnik und Maschinenbau Wien Janner 1972, Heft 1, Seite 1-11; G. Aichholzer.

Optimizing designs of water-resistant magnet wire; V. Kuzenev et al; Elektrotekhnika, vol. 59, No. 12, pp35-40, 1988.

Zur Entwicklung der Tauchpumpenmotoren; A. Schanz; KSB, pp19-24.

Direct Generation of alternating current at high voltages; R. Parsons; IEEE Journal, vol. 67 #393, Jan. 15, 1929, pp1065-1080.

Stopfbachslose Umwalzpumpen– ein wichtiges Element im modernen Kraftwerkbau; H. Holz, KSB 1, pp13-19, 1960.

Zur Geschichte der Brown Boveri-Synchron-Maschinen; Vierzig Jahre Generatorbau; Jan.-Feb. 1931 pp15-39.

Technik und Anwendung moderner Tauchpumpen; A. Heumann; 1987.

High capacity synchronous generator having no tooth stator; V.S. Kildishev et al; No. 1, 1977 pp 11-16.

Der Asynchronmotor als Antrieb stopfbcichsloser Pumpen; E. Picmaus; Elektrotechnik und Maschinenbay No. 78, pp153-155, 1961.

Low core loss rotating flux transformer; R. F. Krause, et al; American Institute Physics J.Appl.Phys vol. 64 #10 Nov. 1988, pp5376-5378.

An EHV bulk Power transmission line Made with Low Loss XLPE Cable; Ichihara et al; 8/92; pp3-6.

Underground Transmission Systems Reference Book; 1992; pp16-19; pp36-45; pp67-81.

Power System Stability and Control; P. Kundur, 1994; pp23-25; p. 767.

Six phase Synchronous Machine with AC and DC Stator Connections, Part II:Hannonic Studies and a proposed Uninterruptible Power Supply Scheme; R. Schiferl et al.; Aug. 1983 pp 2694-2701.

Six phase Synchronous Machine with AC and DC Stator Connections, Part 1: Equivalent circuit representation and Steady-State Analysis; R. Schiferl et al; Aug. 1983; pp2685-2693.

Reactive Power Compensation; T. Petersson; 1993; pp 1-23.

Permanent Magnet Machines; K. Binns; 1987; pp 9-1 through 9-26.

Hochspannungsanıogen for Wechselstrom; 97. Hochspannungsaufgaben an Generatoren und Motoren; Roth et al; 1938; pp452-455.

Hochspannungsanlagen for Wechselstrom; 97. Hochspannungsaufgaben an Generatoren und Motoren; Roth et al; Spring 1959, pp30-33.

Neue Lbsungswege zurn Entwurf grosser Turbogeneratoren bis 2GVA, 6OkV; G. Aicholzer; Sep. 1974, pp249-255.

Advanced Turbine-generators- an assessment; A. Appleton, et al; International Conf. Proceedings, Lg HV Elec. Sys. Paris, FR, Aug.-Sep. 1976, vol. I, Section 11-02, p. 1-9.

Fully slotless turbogenerators; E. Spooner; Proc., IEEE vol. 120 #12, Dec. 1973.

Toroidal winding geometry for high voltage superconducting alternators; J. Kirtley et al; MIT—Elec. Power Sys. Engrg. Lab for IEEE PES;Feb. 1974.

High–Voltage Stator Winding Development; D. Albright et al; Proj. Report EL339, Project 1716, Apr. 1984.

POWERFORMER ™: A giant step in power plant engineering; Owman et al; CIGRE 1998, Paper 11:1.1.

Thin Type DC/DC Converter using a coreless wire transformer; K. Onda et al; Proc. IEEE Power Electronics Spec. Conf.; Jun. 1994, pp330–334.

Development of extruded polymer insulated superconducting cable; Jan. 1992.

Transfomer core losses; B. Richardson; Proc. IEEE May 1986, pp365–368.

Cloth–transformer with divided windings and tension annealed amorphous wire; T. Yammamoto et al; IEEE Translation Journal on Magnetics in Japan vol. 4, No. 9, Sep. 1989.

A study of equipment sizes and constraints for a unified power flow controller; J Bian et al; IEEE 1996.

SYNCHRONOUS COMPENSATOR PLANT

TECHNICAL FIELD

The present invention relates to electric machines intended for connection to distribution or transmission networks, hereinafter termed power networks. More specifically the invention relates to synchronous compensator plants for the above purpose, to the use of such a plant and to a method for phase compensation.

BACKGROUND ART

Reactive power is present in all electric power systems that transfer alternating current. Many loads consume not only active power but also reactive power. Transmission and distribution of electric power per se entails reactive losses as a result of series inductances in transformers, overhead lines and cables. Overhead lines and cables also produce reactive power as a result of capacitive connections between phases and between phases and earth potential.

At stationary operation of an alternating current system, active power production and consumption must be in agreement in order to obtain nominal frequency. An equally strong coupling exists between reactive power balance and voltages in the electric power network. If reactive power consumption and production are not balanced in a suitable manner, the consequence may be unacceptable voltage levels in parts of the electric power network. An excess of reactive power in one area leads to high voltages, whereas a deficiency leads to low voltages.

Contrary to active power balance at a nominal frequency, which is controlled solely with the aid of the active power control of the generator, a suitable reactive power balance is obtained with the aid of both controllable excitation of synchronous generators and of other components spread out in the system. Examples of such (phase compensation) components are shunt reactors, shunt capacitors, synchronous compensators and SVCs (Static Var. Compensators).

The location of these phase compensation components in the electric power network affects not only the voltage in various parts of the electric power network, but also the losses in the electric power network since the transfer of reactive power, like the transfer of active power, gives rise to losses and thus heating. It is consequently desirable to place phase compensation components so that losses are minimized and the voltage in all parts of the electric power network is acceptable.

The shunt reactor and shunt capacitor are usually permanently connected or connected via a mechanical breaker mechanism to the electric power network. In other words, the reactive power consumed/produced by these components is not continuously controllable. The reactive power produced/consumed by the synchronous compensator and the SVC, on the other hand, is continuously controllable. These two components are consequently used if there is a demand for high-performance voltage control.

The following is a brief description of the technology for phase compensation with the aid of synchronous compensator and SVC.

A synchronous compensator is in principle a synchronous motor running at no load, i.e. it takes active power from the electric power network equivalent to the machine losses.

The rotor shaft of a synchronous compensator is usually horizontal and the rotor generally has six or eight salient poles. The rotor is usually dimensioned thermally so that the synchronous compensator, in over-excited state, can produce approximately 100% of the apparent power the stator is thermally dimensioned for (rated output) in the form of reactive power. In under-excited state, when the synchronous compensator consumes reactive power, it consumes approximately 60% of the rated output (standard value, depending on how the machine is dimensioned). This gives a control area of approximately 160% of rated output over which the reactive power consumption/production can be continuously controlled. If the machine has salient poles with relatively little reactance in transverse direction, and is provided with excitation equipment enabling both positive and negative excitation, more reactive power can be consumed than the 60% of rated output stated above, without the machine exceeding the stability limit. Modern synchronous compensators are normally equipped with fast excitation systems, preferably a thyristor-controlled static exciter where the direct current is supplied to the rotor via slip rings. This solution enables both positive and negative supply as above.

The magnetic circuits in a synchronous compensator usually comprise a laminated core, e.g. of sheet steel with a welded construction. To provide ventilation and cooling the core is often divided into stacks with radial and/or axial ventilation ducts. For larger machines the laminations are punched out in segments which are attached to the frame of the machine, the laminated core being held together by pressure fingers and pressure rings. The winding of the magnetic circuit is disposed in slots in the core, the slots generally having a cross section in the shape of a rectangle or trapezium.

In multi-phase electric machines the windings are made as either single or double layer windings. With single layer windings there is only one coil side per slot, whereas with double layer windings there are two coil sides per slot. By coil side is meant one or more conductors combined vertically or horizontally and provided with a common coil insulation, i.e. an insulation designed to withstand the rated voltage of the machine to earth.

Double-layer windings are generally made as diamond windings whereas single layer windings in the present context can be made as diamond or flat windings. Only one (possibly two) coil width exists in diamond windings whereas flat windings are made as concentric windings, i.e. with widely varying coil width. By coil width is meant the distance in arc dimension between two coil sides pertaining to the same coil.

Normally all large machines are made with double-layer winding and coils of the same size. Each coil is placed with one side in one layer and the other side in the other layer. This means that all coils cross each other in the coil end. If there are more than two layers these crossings complicate the winding work and the coil end is less satisfactory.

It is considered that coils for rotating machines can be manufactured with good results up to a voltage range of 10–20 kV.

A synchronous compensator has considerable short-duration overload capacity. In situations when electromechanical oscillations occur in the power system the synchronous compensator can briefly supply reactive power up to twice the rated output. The synchronous compensator also has a more long-lasting overload capacity and is often able to supply 10 to 20% more than rated output for up to 30 minutes.

Synchronous compensators exist in sizes from a few MVA to hundreds of MVA. The losses for a synchronous compensator cooled by hydrogen gas amount to approximately 10 W/kvar, whereas the corresponding figure for air-cooled synchronous compensators is approximately 20 W/kvar.

Synchronous compensators were preferably installed in the receiving end of long radial transmission lines and in important nodes in masked electric power networks with long transmission lines, particularly in areas with little local generation. The synchronous compensator is also used to increase the short-circuit power in the vicinity of HVDC inverter stations.

The synchronous compensator is most often connected to points in the electric power network where the voltage is substantially higher than the synchronous compensator is designed for. This means that, besides the synchronous compensator, the synchronous compensator plant generally includes a step-up transformer, a busbar system between synchronous compensator and transformer, a generator breaker between synchronous compensator and transformer, and a line breaker between transformer and electric power network.

In recent years SVCs have to a great extent replaced synchronous compensators in new installations because of their advantages particularly with regard to cost, but also in certain applications because of technical advantages.

The SVC concept (Static Var. Compensator) is today the leading concept for reactive power compensation and, as well as in many cases replacing the synchronous compensator in the transmission network, it also has industrial applications in connection with electric arc furnaces. SVCs are static in the sense that, contrary to synchronous compensators, they have no movable or rotating main components.

SVC technology is based on rapid breakers built up of semi-conductors, thyristors. A thyristor can switch from nonconductor to conductor in a few millionths of a second. Capacitors and reactors can be connected or disconnected with negligible delay with the aid of thyristor bridges. By combining these two components reactive power can be stoplessly either supplied or extracted.

A SVC plant typically consists of both capacitor banks and reactors and since the thyristors generate harmonics, the plant also includes harmonic filters. Besides control equipment, a transformer is also required between the compensation equipment and the network in order to obtain optimal compensation from the size and cost point of view. SVC plant is available in size from a few MVA up to 650 MVA, with nominal voltages up to 765 kV.

Various SVC plant types exist, named after how the capacitors and reactors are combined. Two usual elements that may be Included are TSC or TCR. TSC is a thyristor-switched reactive power-producing capacitor and TCR is a thyristor-switched reactive power-consuming reactor. A usual type is a combination of these elements, TSC/TCR.

The magnitude of the losses depends much on which type of plant the SVC belongs to, e.g. a FC/TCR type (FC means that the capacitor is fixed) has considerably greater losses than a TSC/TCR. The losses for the latter type are approximately comparable with the losses for a synchronous compensator.

It should be evident from the above summary of the phase compensation technology that this can be divided into two principal concepts, namely synchronous compensation and SVC.

These concepts have different strengths and weaknesses. Compared with the synchronous compensator, the SVC has the main advantage of being cheaper. However, it also permits somewhat faster control which may be an advantage in certain applications.

The drawbacks of the SVC as compared with the synchronous compensator include:
  it has no overload capacity. In operation at its capacitive limit the SVC becomes in principle a capacitor, i.e. if the voltage drops then the reactive power production drops with the square of the voltage. If the purpose of the phase compensation is to enable transfer of power over long distances the lack of overload capacity means that, in order to avoid stability problems, a higher rated output must be chosen if SVC plant is selected than if synchronous compensator plant is selected.
  it requires filters if it includes a TCR.
  it does not have a rotating mass with internal voltage source. This is an advantage with the synchronous compensator, particularly in the vicinity of HVDC transmission.

In order to achieve a more competitive electricity market many countries have deregulated, or are in the process of deregulating, the electricity market. This usually involves a separation of power production and transmission services into separate entities. When these two parts of the system are in different hands, the previously existing link between the planning of generation plants and transmission lines is broken. A generation plant owner may announce the closing of a generation plant at timescales which are, for hardware investments, very short, presenting the operators and planners of transmission services with major changes in both load flow patterns and the location of controllable reactive production/consumption resources at short notice. Consequently, there is a strategic need for a phase compensation unit that can be relocated, within short lead time, to an arbitrary node in the transmission system.

In countries where the electricity market has not been deregulated there may also exist a need to have relocatable phase compensation components. For instance, countries with a large share of nuclear power production may encounter situations similar to that described above. Normally, nuclear power plants are closed down once a year during a low load season, for inspections and reparations. However, occasionally these plants may have to stay closed for longer periods of time due to major reparations. Although this situation is easier to handle in a country which has not deregulated the electricity market, the size of a typical nuclear plant may imply that the changes in load flow patterns and the absence of controllable reactive production/consumption resources puts the operators of the transmission system in situations which are difficult to handle while maintaining prescribed security standards. There exists a need for a relocatable phase compensation unit also in these situations.

There exist today a small number of relocatable SVC plants, see e.g. the article "Relocatable static var compensators help control unbundled power flows" in the Magazine "Modern Power Systems", December 1996, pages 49–54. In addition to the differences between a static and a synchronous compensator described above, the relocatable static compensator involves a number of containers, which requires a fairly large area at the site and which needs to be electrically interconnected at the site. But most importantly the relocatable static compensator can only be connected to nodes in the transmission system where a step-down transformer already is available, providing a fairly low voltage. In other words, the relocatable static compensator cannot be directly connected to the transmission system voltage (typically 130 kV and up).

Due to the number of components required in a synchronous compensator plant and in particular the up to now necessary presence of a transformer, synchronous compensator plants for high-voltage networks up to now have been realized solely as stationary plants. In case of change in an existing power network regarding the need for phase compensation the plant might be superfluous at its location or might be required to be designed and dimensioned different, or a plant might be required somewhere else in the network. This of course is a serious drawback with such a stationary plant.

DESCRIPTION OF THE INVENTION

The object of the present invention is to attain a synchronous compensator plant avoiding this drawback.

According to the invention this object has been achieved by way of a synchronous compensator plant described herein.

Thanks to the fact that the winding(s) in the rotating electric machine in the synchronous compensator plant is/are manufactured with a special solid insulation, a voltage level can be achieved for the machine which is far above the limits a conventional synchronous compensator can be practically or financially constructed for. The voltage level may reach any level applicable in power networks for distribution and transmission. The advantage is thus achieved that the synchronous compensator can be connected directly to such networks without intermediate connection of a step-up transformer.

Elimination of the transformer per se entails great savings in cost, weight and space, but also has other decisive advantages over a conventional synchronous compensator plant.

The efficiency of the plant is increased. Moreover, reactive losses incurred by the transfomer's consumption of reactive power are avoided and so is the resultant shift in phase angle. This has a positive effect as regards the static and dynamic stability margins of the system. Furthermore, a conventional transformer contains oil, which entails a fire risk. This is eliminated in a plant according to the invention, and the requirement for various types of fire-precautions is reduced. Many other electrical coupling components and protective equipment are also reduced. This gives reduced plant costs and less need for service and maintenance.

These and other advantages result in a synchronous compensator plant being considerably smaller and less expensive than a conventional plant, and that the operating economy is radically improved thanks to less maintenance and smaller losses.

Thanks to these advantages a synchronous compensator plant according to the invention will contribute to this concept being financially competitive with the SVC concept (see above) and even offering cost benefits in comparison with this.

The fact that the invention makes the synchronous compensator concept competitive in comparison with the SVC concept therefore enables a return to the use of synchronous compensator plants. The drawbacks associated with SVC compensation are thus no longer relevant. The complicated, bulky banks of capacitors and reactors in a SVC plant are one such drawback. Another big drawback with SVC technology is its static compensation which does not give the same stability as that obtained by the inertia obtained in a rotating electric machine with its rotating e.m.f. as regards both voltage and phase angle. A synchronous compensator is therefore better able to adjust to temporary disturbances in the network and to fluctuations in the phase angle. The thyristors that control a SVC plant are also sensitive to displacement of the phase angle. A plant according to the invention also enables the problem of harmonics to be solved.

The synchronous compensator plant according to the invention thus enables the advantages of synchronous compensator technology over SVC technology to be exploited so that a more efficient and stable compensation is obtained at a cost superior to this from the point of view of both plant investment and operation.

The plant according to the invention is small, inexpensive, efficient and reliable, both in comparison with a conventional synchronous compensator and a SVC.

The reduction of the amount of required components in the plant and in particular the elimination of the transformers in the plant makes the design of the plant as a mobile unit possible. By making the plant as a mobile unit that can be transported by a lorry, a railway truck, a helicopter or the like, the plant can be moved from one location of a power network to another, should the need for phase compensation in the network change.

With a synchronous compensator plant having components with windings of the specific construction as described herein and making use of the possibility to design the plant as a mobile unit the drawbacks related to stationary synchronous compensator plants thus are overcome. This is primarily of relevance for high-voltage networks, in particular in the range of 36 kV and above.

Another object of the invention is to satisfy the need for fast, continuously controllable reactive power which is directly connected to sub-transmission or transmission level in order to manage the system stability and/or dependence on rotating mass and the electromotive force in the vicinity of HVDC transmission. The plants shall be able to supply anything from a few MVA up to several hundreds of MVA.

The advantage gained by satisfying said objects is the avoidance of the intermediate transformer, the reactance of which otherwise consumes reactive power. This also enables the avoidance of traditional so-called generator breakers. Advantages are also obtained as regards network quality since there is rotating compensation. With a plant according to the invention the overload capacity is also increased, which with the invention may be +100%. The synchronous compensator according to the invention may be given higher overload capacity in over-excited operation than conventional synchronous compensators, both as regards short-duration and long-duration overload capacity. This is primarily because the time constants for heating the stator are large with electric insulation of the stator winding according to the invention. However, the thermal dimensioning of the rotor must be such that it does not limit the possibilities of exploiting this overload capacity.

To accomplish this the magnetic circuit in the electric machine included in the synchronous compensator plant is formed with threaded permanent insulating cable with included earth. The invention also relates to a procedure for manufacturing such a magnetic circuit.

The major and essential difference between known technology and the embodiment according to the invention is thus that this is achieved with an electric machine provided with solid insulation, the magnetic circuit(s) of the winding(s) being arranged to be directly connected via breakers and disconnectors to a high supply voltage of between 20 and 800 kV, preferably higher than 36 kV. The magnetic circuit thus comprises a laminated core having a winding consisting of a threaded cable with one or more permanently insulated conductors having a semiconducting layer both at the conductor and outside the insulation, the outer semiconducting layer being connected to earth potential.

To solve the problems arising with direct connection of electric machines to all types of high-voltage power networks, a machine in the plant according to the invention has a number of features as mentioned above, which differ distinctly from known technology. Additional features and further embodiments are defined in the dependent claims and are discussed in the following.

Such features mentioned above and other essential characteristics of the synchronous compensator plant and the electric machine according to the invention included therein, include the following:

The winding of the magnetic circuit is produced from a cable having one or more permanently insulated conductors with a semiconducting layer at both conductor and sheath. Some typical conductors of this type are XLPE cable or a cable with EP rubber insulation which, however, for the present purpose are further developed both as regards the strands in the conductor and the nature of the outer sheath. XLPE=crosslinked polyethylene. EP=ethylene propylene.

Cables with circular cross section are preferred, but cables with some other cross section may be used in order to obtain better packing density, for instance.

Such a cable allows the laminated core to be designed according to the invention in a new and optimal way as regards slots and teeth.

The winding is preferably manufactured with insulation in steps for best utilization of the laminated core.

The winding is preferably manufactured as a multi-layered, concentric cable winding, thus enabling the number of coil-end intersections to be reduced.

The slot design is suited to the cross section of the winding cable so that the slots are in the form of a number of cylindrical openings running axially and/or radially outside each other and having an open waist running between the layers of the stator winding.

The design of the slots is adjusted to the relevant cable cross section and to the stepped insulation of the winding. The stepped insulation allows the magnetic core to have substantially constant tooth width, irrespective of the radial extension.

The above-mentioned further development as regards the strands entails the winding conductors consisting of a number of impacted strata/layers, i.e. Insulated strands that from the point of view of an electric machine, are not necessarily correctly transposed, uninsulated and/or insulated from each other.

The above-mentioned further development as regards the outer sheath entails that at suitable points along the length of the conductor, the outer sheath is cut off, each cut partial length being connected directly to earth potential.

The use of a cable of the type described above allows the entire length of the outer sheath of the winding, as well as other parts of the plant, to be kept at earth potential. An important advantage is that the electric field is close to zero within the coil-end region outside the outer semiconducting layer. With earth potential on the outer sheath the electric field need not be controlled. This means that no field concentrations will occur either in the core, in the coil-end regions or in the transition between them.

The mixture of insulated and/or uninsulated impacted strands, or transposed strands, results in low stray losses.

The cable for high voltage used in the magnetic circuit winding is constructed of an inner core/conductor with a plurality of strands, at least two semiconducting layers, the innermost being surrounded by an insulating layer, which is in turn surrounded by an outer semiconducting layer having an outer diameter in the order of 20–250 mm and a conductor area in the order of 300–3000 mm$^2$.

The insulated conductor or cable used in the present invention is flexible and of a kind which is described in more detail in WO 97/45919 and WO 97/45847. Additional descriptions of the insulated conductor or cable concerned can be found in WO 97/45918, WO 97/45930 and WO 97/45931.

Accordingly, the windings, in the arrangement according to the invention, are preferably of a type corresponding to cables having solid, extruded insulation, of a type now used for power distribution, such as XLPE-cables or cables with EPR-insulation. Such a cable comprises an inner conductor composed of one or more strand parts, an inner semiconducting layer surrounding the conductor, a solid insulating layer surrounding this and an outer semiconducting layer surrounding the insulating layer. Such cables are flexible, which is an important property in this context since the technology for the arrangement according to the invention is based primarily on winding systems in which the winding is formed from cable which is bent during assembly. The flexibility of an XLPE-cable normally corresponds to a radius of curvature of approximately 20 cm for a cable with a diameter of 30 mm, and a radius of curvature of approximately 65 cm for a cable with a diameter of 80 mm. In the present application the term "flexible" is used to indicate that the winding is flexible down to a radius of curvature in the order of four times the cable diameter, preferably eight to twelve times the cable diameter.

The winding should be constructed to retain its properties even when it is bent and when it is subjected to thermal or mechanical stress during operation. It is vital that the layers retain their adhesion to each other in this context. The material properties of the layers are decisive here, particularly their elasticity and relative coefficients of thermal expansion. In an XLPE-cable, for instance, the insulating layer consists of cross-linked, low-density polyethylene, and the semiconducting layers consist of polyethylene with soot and metal particles mixed in. Changes in volume as a result of temperature fluctuations are completely absorbed as changes in radius in the cable and, thanks to the comparatively slight difference between the coefficients of thermal expansion in the layers in relation to the elasticity of these materials, the radial expansion can take place without the adhesion between the layers being lost.

The material combinations stated above should be considered only as examples. Other combinations fulfilling the conditions specified and also the condition of being semiconducting, i.e. having resistivity within the range of $10^{-1}$–$10^6$ ohm-cm, e.g. 1–500 ohm-cm, or 10–200 ohm-cm, naturally also fall within the scope of the invention.

The insulating layer may consist, for example, of a solid thermoplastic material such as low-density polyethylene (LDPE), high-density polyethylene (HDPE), polypropylene (PP), polybutylene (PB), polymethyl pentene ("TPX"), cross-linked materials such as cross-linked polyethylene (XLPE), or rubber such as ethylene propylene rubber (EPR) or silicon rubber.

The inner and outer semiconducting layers may be of the same basic material but with particles of conducting material such as soot or metal powder mixed in.

The mechanical properties of these materials, particularly their coefficients of thermal expansion, are affected relatively little by whether soot or metal powder is mixed in or not—at least in the proportions required to achieve the conductivity necessary according to the invention. The insulating layer and the semiconducting layers thus have substantially the same coefficients of thermal expansion.

Ethytene-vinyl-acetate copolymers/nitrile rubber (EVA/NBR), butyl graft polyethylene, ethylene-butyl-acrylate copolymers (EBA) and ethylene-ethyl-acrylate copolymers (EEA) may also constitute suitable polymers for the semiconducting layers.

Even when different types of material are used as base in the various layers, it is desirable for their coefficients of thermal expansion to be substantially the same. This is the case with the combination of the materials listed above.

The materials listed above have relatively good elasticity, with an E-modulus of E<500 MPa, preferably <200 MPa. The elasticity is sufficient for any minor differences between the coefficients of thermal expansion for the materials in the layers to be absorbed in the radial direction of the elasticity so that no cracks appear, or any other damage, and so that the layers are not released from each other. The material in the layers is elastic, and the adhesion between the layers is at least of the same magnitude as in the weakest of the materials.

The conductivity of the two semiconducting layers is sufficient to substantially equalize the potential along each layer. The conductivity of the outer semiconducting layer is sufficiently high to enclose the electrical field within the cable, but sufficiently low not to give rise to significant losses due to currents induced in the longitudinal direction of the layer.

Thus, each of the two semiconducting layers essentially constitutes one equipotential surface, and these layers will substantially enclose the electrical field between them.

There is, of course, nothing to prevent one or more additional semiconducting layers being arranged in the insulating layer.

According to a particularly preferred embodiment of the invention, at least two of these layers, preferably all three, have the same coefficient of thermal expansion. The decisive benefit is thus achieved that defects, cracks or the like are avoided at thermal movement in the winding.

The invention also relates to a procedure for manufacturing the magnetic circuit for the electric machine included in the synchronous compensator plant. The procedure entails the winding being placed in the slots by threading the cable through the cylindrical openings in the slots.

In one embodiment of the present invention, the phases of the stator winding are Y-connected.

In another embodiment of the present invention, the winding of the machine is arranged for self-regulating field control, and lacks auxiliary means for controlling the field.

Since the insulation system, suitably permanent, is designed so that from the thermal and electrical point of view it is dimensioned for over 36 kV, the plant can be connected to high-voltage power networks without any intermediate step-up transformer, thereby achieving the advantages referred to above.

The above-mentioned and other advantageous embodiments of the invention are defined in the dependent claims.

BRIEF DESCRIPTION OF THE DRAWINGS

The invention will be described in more detail in the following detailed description of a preferred embodiment of the construction of the magnetic circuit of the electrical machine in the synchronous compensator plant, with reference to the accompanying drawings in which.

DESCRIPTION OF A PREFERRED EMBODIMENT

Figure 1:
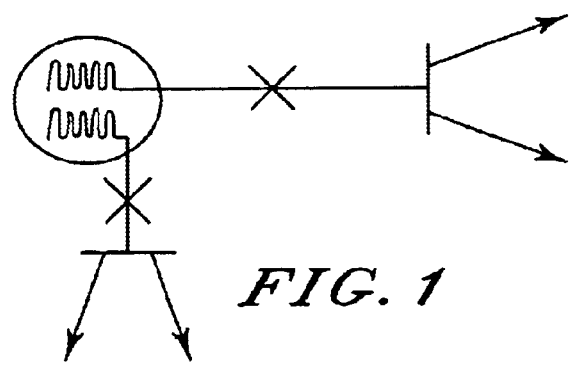
FIG. 1 shows a single line diagram of the invented synchronous compensator plant.

FIG. 1 shows a single line diagram of the synchronous compensator plant according to a preferred embodiment of the invention, where the machine is arranged for direct connection to the power network, without any step-up transformer, at two different voltage levels.

Figure 2:
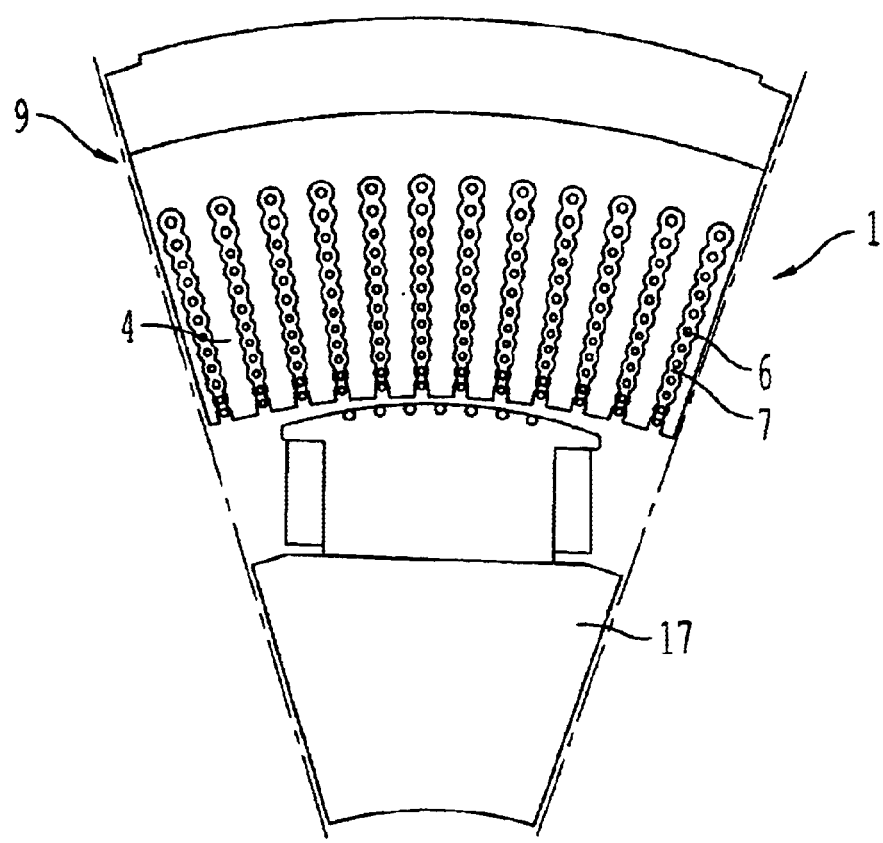
FIG. 2 shows a schematic axial end view of a sector of the stator in an electric machine in the synchronous compensator plant according to the invention.

In the schematic axial view through a sector of the stator 1 according to FIG. 2, pertaining to the electric machine included in the synchronous compensator plant, the rotor 17 of the machine is also indicated. The stator 1 is composed in conventional manner of a laminated core. FIG. 2 shows a sector of the machine corresponding to one pole pitch. From a yoke part 9 of the core situated radially outermost, a number of teeth 4 extend radially in towards the rotor 17 and are separated by slots 7 in which the stator winding is arranged. Cables 6 forming this stator winding, are high-voltage cables which may be of substantially the same type as those used for power distribution, i.e. XLPE cables, but without any outer, mechanically-protective sheath. Thus, the semiconducting layer which is sensitive to mechanical damage lies naked on the surface of the cable.

The cables 6 are illustrated schematically in FIG. 2, only the conducting central part of each cable part or coil side being drawn in. As can be seen, each slot 7 has varying cross section with alternating wide parts and narrow parts. The wide parts are substantially circular and surround the cabling, the waist parts between these forming narrow parts. The waist parts serve to radially fix the position of each cable. The cross section of the slot 7 also narrows radially inwards. This is because the voltage on the cable parts is lower the closer to the radially inner part of the stator 1 they are situated. Slimmer cabling can therefore be used there, whereas coarser cabling is necessary further out. In the example illustrated, cables of three different dimensions are used, arranged in three correspondingly dimensioned sections of slots 7.

Figure 3:
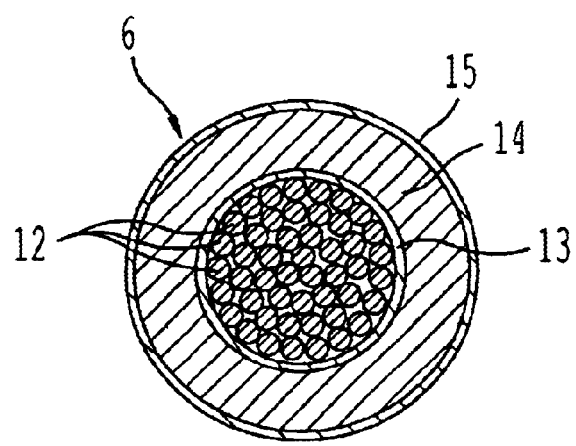
FIG. 3 shows an end view, step-stripped, of a cable used in the winding of the stator according to FIG. 2, FIG. 4 schematically shows the inverted plant transported on a lorry, FIG. 5 a schematic diagram showing a Y connection with a suppression filter connected thereto.

FIG. 3 is showing a cross section through a high voltage winding 6 used in the present invention. The high voltage winding 6 comprises a current-carrying conductor in the form of a number of strands 12 with circular cross sections which strands 12 are arranged in the middle of the high voltage winding 6. Around the strands 12 there is a first layer 13 with semiconducting properties. Around the first semiconducting layer 13 is arranged a layer of solid insulation 14 for example XLPE-insulation. Around the insulation layer 14 there is a second layer 15 with semiconducting properties. The diameter of the high voltage winding is 20–250 mm and the conducting area lies in the interval of 80–3000 mm$^2$.

The three layers are arranged to adhere to each other even when the cable is bent. The cable shown is flexible, and this property is maintained during the entire life of the cable.

Figure 4:
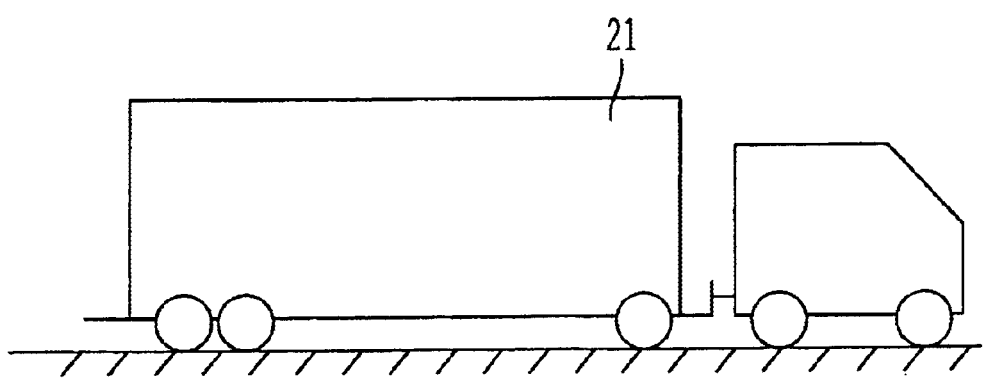

In FIG. 4 it is schematically illustrated how the complete plant constitutes a mobile unit 21 that can be transported on a lorry.

Figure 5:
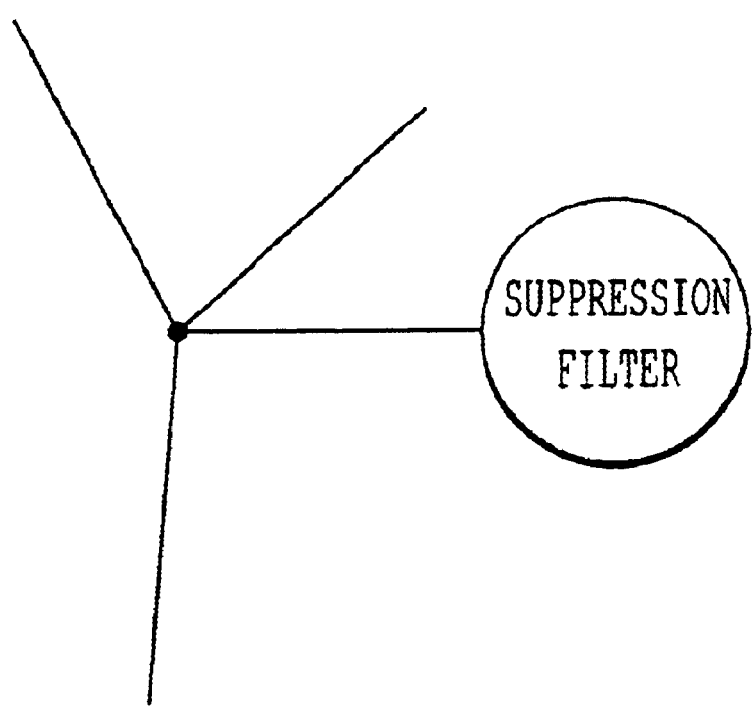

FIG. 5 is a diagram showing 3 phases connected at a common Y point and connected to a suppression filter for reducing third harmonics.

What is claimed is:

1. A mobile synchronous compensator plant comprising:
   at least one rotating electric machine having at least one winding wherein the winding comprises a current-carrying conductor surrounded by an insulation system including at least two semiconducting layers, each of said semiconducting layers essentially constituting an equipotential surface and including solid insulation disposed therebetweeen, wherein
   the plant is transportable by a lorry, a railway truck, or a helicopter, and
   the current-carrying conductor includes a plurality of strands, and at least a portion of said strands being insulated strands.
2. The mobile plant as claimed in claim 1, wherein at least one of the layers has substantially the same coefficient of thermal expansion as the solid insulation.
3. The mobile plant as claimed in claim 1, wherein the winding comprises a cable for high voltage including the current-carrying conductor surrounded by the insulation system.
4. The mobile plant as claimed in claim 3, wherein the innermost semiconducting layer is at substantially the same potential as the conductor(s).
5. The mobile plant as claimed in claim 3, wherein at least two of said layers have substantially the same coefficient of thermal expansion.
6. The mobile plant as claimed in claim 3, wherein the plurality of strands of the current carrying conductor includes uninsulated strands that are in electrical contact with one another.
7. The mobile plant as claimed in claim 3, wherein the cable forming the stator winding has a gradually decreasing insulation seen from the high-voltage side.
8. The mobile plant as claimed in claim 7, wherein the gradual decrease in the insulation thickness is step-wise or continuous.
9. The mobile plant as claimed in claim 1, wherein said outer semiconducting layer is connected to a selected potential.
10. The mobile plant as claimed in claim 9, wherein the selected potential is earth potential.
11. The mobile plant as claimed in claim 1, wherein the winding consists of a cable comprising the current-carrying conductor that consisting of a number the plurality of strands, an inner semiconducting layer being arranged around the conductor, an insulating layer of solid insulation being arranged around the inner semiconducting layer and an outer semiconducting layer being arranged around the insulating layer.
12. The mobile plant as claimed in claim 11, wherein the cable includes a metal screen and a sheath.
13. The mobile plant as claimed in claim 1, wherein said layers are arranged to adhere to one another even when the insulated conductor or cable is bent.
14. The mobile plant as claimed in claim 1, wherein a magnetic circuit is arranged in a rotating electric machine, the stator of which is cooled at earth potential.
15. The mobile plant as claimed in claim 1, wherein the machine includes a stator having slots and magnetic circuit slot being formed as a number of cylindrical openings running axially and radially outside each other, having substantially circular cross section and separated by narrow waist parts between the cylindrical openings for receiving the windings thereon.
16. The mobile plant as claimed in claim 15, wherein the circular cross section of the substantially cylindrical openings in the slots for the stator winding has decreasing radius.
17. The mobile plant as claimed in claim 15, wherein the stator includes a plurality of Y-connected phases.
18. The mobile plant as claimed in claim 17, wherein the phases have a common Y-point being insulated from earth potential or connected to each potential via a high-ohmic impedance and protected from over-voltages by means of surge arresters.
19. The mobile plant as claimed in claim 17, wherein the phases have a common Y-point for connection to earth via a suppression filter of third harmonic type for reducing third harmonic currents in the electric machine at the same time as being dimensioned to limit voltages and currents in the event of faults in the plant.
20. The mobile plant as claimed in claim 19, wherein the suppression filter is protected from over-voltages by means of surge arresters, the latter being connected in parallel with the suppression filter.
21. The mobile plant as claimed in claim 1, wherein the machine can be started from a local power supply.
22. The mobile plant as claimed in claim 21, wherein the machine has two or more poles.
23. The mobile plant as claimed in claim 22, wherein the rotor and the stator are so dimensioned that at nominal voltage, nominal power factor and over-excited operation, thermally based stator current limit is exceeded before the thermally based rotor current limit has been exceeded.
24. The mobile plant as claimed in claim 22, wherein the rotor and the stator are so dimensioned that at nominal voltage, nominal power factor and over-excited operation, thermally based current limits of stator and rotor are exceeded approximately simultaneously.
25. The mobile plant as claimed in claim 24, having 100% overload capacity at nominal voltage, nominal power factor and at overexcited operation.
26. The mobile plant as claimed in claim 24, wherein the rotor poles are pronounced.
27. The mobile plant as claimed in claim 26, wherein the quadrature-axis synchronous reactance is less than the direct-axis cynchronous reactance.
28. The mobile plant as claimed in claim 27, wherein the machine includes excitation systems enabling both positive and negative excitation.
29. The mobile plant as claimed in claim 28, wherein the cable has a conductor area between 30 and 3000 mm$^2$ and an outer cable diameter of between 20 and 250 mm.
30. The mobile plant as claimed in claim 29, wherein the stator and rotor have circuits including cooling means in which the coolant is in liquid and/or gaseous form.
31. The mobile plant as claimed in claim 30, wherein the machine is arranged for connection to several different voltage levels.
32. The mobile plant as claimed in claim 1, wherein the machine is directly connectable to the power network without any step-up transformer.
33. The mobile plant as claimed in claim 1, wherein the winding of the machine is arranged for self-regulating field control without auxiliary means for control of the field.
34. The mobile plant as claimed in claim 1, wherein insulation system which, as regards it thermal and electrical properties, permits a voltage level in the machine exceeding 36 kV.

35. The mobile plant as claimed in claim 1, wherein the plant is mounted on wheels.

36. The mobile plant according to claim 1, wherein:

the mobile plant is configured to provide phase compensation at a plurality of localities of a high voltage power network.

37. A method for phase compensation in a high voltage power network using a mobile synchronous compensator plant including:

providing at least one rotating electric machine having at least one winding having a current carrying conductor with a plurality of strands, a portion of said strands being insulated strands, an insulation system including at a first semiconducting layer, a solid insulation layer surrounding the first semiconducting layer, and a second semiconducting layer surrounding the solid insulation layer, the first semiconducting layer and the second semiconducting layer being configured to provide respective essentially equipotential surfaces, and the mobile plant being configured to be transportable by at least one of a lorry, a railway truck, and a helicopter, providing phase compensation at a first locality of the high voltage power network;

transporting the mobile plant from the first locality to a second locality of the high voltage power network; and providing phase compensation at the second locality.

* * * * *